(12) United States Patent
Lamb et al.

(10) Patent No.: US 6,478,986 B1
(45) Date of Patent: Nov. 12, 2002

(54) MANUFACTURING PROCESS FOR QUATERNARY AMMONIUM TANNATE, A VEGETABLE COAGULATING/FLOCCULATING AGENT

(75) Inventors: Luiz Henrique Lamb, Triunfo (BR); Otávio Guimarães Decusati, Montenegro (BR)

(73) Assignee: Tanac S.A., Montenegro (BR)

( * ) Notice: Subject to any disclaimer, the term of this patent is extended or adjusted under 35 U.S.C. 154(b) by 19 days.

(21) Appl. No.: 09/640,861

(22) Filed: Aug. 18, 2000

(30) Foreign Application Priority Data

Aug. 27, 1999 (BR) ............................................... 9904021

(51) Int. Cl.⁷ ............................. C02F 1/54; C02F 5/12; C07C 215/50

(52) U.S. Cl. ...................... 252/180; 210/730; 564/283; 564/287

(58) Field of Search ................... 252/180; 210/730; 560/68, 69; 564/283, 287, 337

(56) References Cited

U.S. PATENT DOCUMENTS

| | | | | |
|---|---|---|---|---|
| 2,341,907 A | * | 2/1944 | Cheetham et al. ...... | 252/180 X |
| 2,548,588 A | * | 4/1951 | Carrara ........................ | 560/69 |
| 2,579,453 A | * | 12/1951 | Post et al. ................. | 560/68 X |
| 3,790,606 A | * | 2/1974 | Sellet ...................... | 564/283 X |
| 4,071,327 A | * | 1/1978 | Dorer, Jr. | |
| 4,558,080 A | * | 12/1985 | Quamme et al. ........ | 252/180 X |
| 4,710,586 A | * | 12/1987 | Patel et al. .................... | 560/68 |
| 4,781,839 A | * | 11/1988 | Kelly et al. ............. | 210/730 X |
| 5,256,304 A | * | 10/1993 | Meyer et al. ........... | 252/180 X |
| 5,659,002 A | * | 8/1997 | Reed et al. ............. | 210/730 X |

* cited by examiner

*Primary Examiner*—Richard D. Lovering
(74) *Attorney, Agent, or Firm*—Birch, Stewart, Kolasch & Birch, LLP

(57) ABSTRACT

The present invention refers to a process for preparing a coagulating/flocculating agent comprising the following steps: a) mixing an aldehyde, an ammonium salt, and a mineral acid catalyst in a reaction vat at a temperature below 45° C. in an aqueous medium; b) reacting said mixture by heating said mixture until a colorless liquid is obtained; c) reacting said obtained colorless liquid with an aqueous tannin solution by stirring and heating to obtain a viscous liquid; and d) optionally, atomizing said viscous liquid to obtain a uniformly grained powder.

15 Claims, No Drawings

MANUFACTURING PROCESS FOR QUATERNARY AMMONIUM TANNATE, A VEGETABLE COAGULATING/FLOCCULATING AGENT

FIELD OF THE INVENTION

The process of making a flocculating agent for purifying and clarifying water for various applications, including human consumption is the field of the present invention.

DESCRIPTION OF THE RELATED ART

The present processes of purifying and clarifying water use inorganic salts, mainly aluminum and iron salts, as coagulating and flocculating agents. The inorganic salts through its coagulating and flocculating properties remove the impurities from the water.

BRIEF SUMMARY OF THE INVENTION

The present invention embodies a manufacturing process of a quaternary tannate as a coagulating/flocculating agent. The flocculating agent is used for treating drinking water and water used in industry, such as for boilers and cooling towers. The present invention embodies the treatment of industrial effluents and domestic sewage with a synthetic coagulating/flocculating agent with organic and vegetable properties.

The coagulating/flocculating agent is a vegetable polyelectrolytic cation. The raw material for the manufacturing of polyelectrolytic cation is pyrochatechin tannin, which is an extract of Acacia mearnsii bark. This tannin has cationic properties. We obtained the vegetable polyelectrolytic cation by reacting the vegetable tannin, a phenolic polymer that acts as a nucleopbile in the face of an electrophilic system, with reaction products of an aldehyde reacting with amines.

DETAILED DESCRIPTION OF THE INVENTION

An embodiment of the present invention is a process for preparing the coagulating/flocculating agent. This process is comprised of the following steps:

a) mixing an aldehyde, an ammonium salt, and a mineral acid catalyst in a reaction vat at a temperature below 45° C. at environmental pressure in an aqueous medium;

b) reacting said mixture by heating said mixture in a temperature range from about 60° C. to 75° C. until a colorless liquid is obtained, usually takes from 5 to 9 hours;

c) reacting said obtained colorless liquid with an aqueous tannin solution by stirring at normal pressure at a temperature range of from about 45° C. to about 97° C. for at least 5 hours to obtain a viscous liquid, wherein the viscous liquid has a viscosity of about 30 seconds in a No. 4 Ford cup; and d) optionally, atomizing said viscous liquid at temperatures from about 170° C. to about 240° C. to obtain a uniformly grained powder.

The process of preparing process the coagulating/flocculating agent is based on a Mannich reaction. Initially, an ammonium salt reacts with an aldehyde using a mineral acid catalyst to give a complex mixture of primary and secondary amines. The complex mixture then reacts with the tannin using acid catalysis, which results in the vegetable polyelectrolytic cation, the coagulating/flocculating agent of the present invention.

The preparation of the quaternary ammonium tannate use the following materials:

(i) A vegetable tannin, that is chemically a phenolic polymer. The monomeric structure of this phenolic polymer is flavin-3-ol. The amount of vegetable tannin used is from about 44% to 56% by weight of the total mixture.

(ii) An aldehyde, that is preferably an aliphatic aldehyde or furfuraldehyde. The more preferable aliphatic aldehydes are formaldehyde and paraformaldehyde. The most preferable aliphatic aldehyde is a formalin solution, which is a solution of formaldehyde. The amount of aldehyde used is from about 28% to 38% by weight of the total mixture.

(iii) A mineral acid catalyst, that is capable of catalyzing a Mannich reaction. The more preferable mineral acid catalyst is a chloridic acid. The most preferable mineral acid catalyst is hydrochloric acid. The amount of mineral acid catalyst used is from about 5% to 18% by weight of the total mixture.

(iv) A salt, that is capable of reacting in a Mannich reaction, such as ammonium salt. The more preferable salts are salts of methylamine, ethylamine, monoethanolamine, diethanolamine or ammonia. The most preferable ammonium salt is ammonium chloride. The amount of ammonium salt used is from about 17% to 32% by weight of the total mixture.

The resulting product has the general chemical structure of (I) shown below.

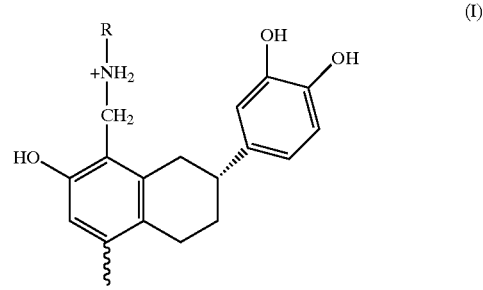

The coagulating/flocculating agent of the present invention is distinct from the traditional agents by its capacity to create chelates with metals dissolved in water. These chelates immobilize the metals next to the coagulating/flocculating agent, and cause them to settle. The immobilized metal is subsequently removed with the generated sludge. This feature is especially efficient when removing ferrous ions present in the water.

Another important feature of the present invention is that the coagulating/flocculating agent acts in a broad pH range, which is contrary to the inorganic salts presently used. The inorganic salts in the present field act in a narrow range of pH. The fundamental difference of the present invention is that the cationic coagulating agent of vegetable origin does not need to be hydrolyzed with the environment to neutralize the charges of the colloidal matter in the water; thus, the cationic coagulating agent of vegetable origin does not alter the pH of the water. This has the added advantage of not requiring an alkalizing agent in the treatment of the water.

The present invention is further explained by the following non-limiting examples.

EXAMPLE 1

In a closed stainless steel reactor, with capacity for 10 liters, adequately sealed, provided with a thermometer, a stirring system, heat and cooling sources, was added while stirring 2,398 g of 37% stabilized formalin, then 580 g of ammonium chloride, and then 330 g of commercial hydrochloric acid. The mixture is heated while stirring to a temperature of 65° C. for 5 hours. Subsequently, the tannin in liquid form is added, 2,980 g with 40% solids, and the stirring continues for 8 hours. The reaction mixture is allowed to cool. The product so obtained and has a viscous appearance with 36% of active material and can be atomized. The density is 1.15 and the pH is between 1.0 and 2.2.

EXAMPLE 2

In similar equipment as in Example 1, 3,190 g of tannin in liquid form with 49% overall solids, was added to a stirring mixture of 2,450 g of 37% stabilized formalin, 450 g of ammonium chloride and 320 g of commercial hydrochloric acid. The mixture is heated for 5 hours to a temperature range of 75° C. to 80° C. Subsequently, the reaction mixture is cooled. The resulting mixture contains 40% of active material, a pH in the range of 1.2 to 2.4 and has a viscosity of 30 seconds in a No. 4 Ford cup.

We claim:

1. A process for preparing a flocculating agent, comprising the steps of:
   a) mixing an aldehyde, an ammonium salt, and a mineral acid catalyst in a reaction vat at a temperature below 45° C. in an aqueous medium;
   b) reacting said mixture by heating said mixture until a colorless liquid is obtained; and
   c) reacting said obtained colorless liquid with an aqueous tannin solution by stirring and heating to obtain a viscous liquid; wherein said aldehyde is about 28% to 38% weight of the total mixture, said ammonium salt is about 17% to 32% weight of the total mixture, and said tannin is about 44% to 56% weight of the total mixture.

2. The process according to claim 1, further comprising adding a strong mineral acid to the reaction mixture in step b) to obtain said colorless liquid with a final pH of 1 to 3.

3. The process according to claim 1, wherein the mineral acid catalyst is a chloridic acid.

4. The process according to claim 1, wherein the mineral acid catalyst is used in an amount of 5 to 18% by weight of the total mixture.

5. The process according to claim 1, wherein the aldehyde is selected from the group consisting of formaldehyde, paraformaldehyde and furfuraldehyde.

6. The process according to claim 1 wherein said ammonium salt is ammonium chloride.

7. The process according to claim 1, wherein step b) takes from 5 to 9 hours.

8. The process according to claim 1, wherein the viscous liquid from step c) has a viscosity of about 30 seconds in a No. 4 Ford cup.

9. The process according to claim 1, wherein in step b) the reaction is heated in a range from about 60° C. to 75° C.

10. The process according to claim 1, wherein step c) is stirred at normal pressure at a temperature range of from about 45° C. to about 97° C. for at least 5 hours.

11. The process according to claim 1, further comprising the step of;
    d) atomizing said viscous liquid by heating to obtain a uniformly grained powder.

12. The process according to claim 11, wherein the atomizing said viscous liquid takes place at temperatures from about 170° C. to about 240° C.

13. The process of claim 1, wherein the tannin solution is comprised of a phenolic polymer.

14. The process according to claim 13, wherein the phenolic polymer has a monomeric structure of flavin-3-ol.

15. A flocculating agent, comprising
    a modified tannin, the modified tannin is a product produced from the process comprising:
    a) mixing an aldehyde, an ammonium salt, and a mineral acid catalyst in a reaction vat at a temperature below 45° C. in an aqueous medium;
    b) reacting said mixture by heating said mixture in a temperature range from about 600° C. to 750° C. until a colorless liquid is obtained; and
    c) reacting said obtained colorless liquid with an aqueous tannin solution by stirring and heating to obtain a viscous liquid,
    wherein said aqueous tannin solution is 44% to 56% weight of the total mixture and is obtained from an aqueous extract of Acacia mearnsii bark, and wherein said aldehyde is 28% to 38% weight of the total mixture and said ammonium salt is 17% to 32% weight of the total mixture.

* * * * *